United States Patent [19]

Kim

[11] Patent Number: 5,592,917
[45] Date of Patent: Jan. 14, 1997

[54] INTAKE AIR CONTROL DEVICE FOR AN INTERNAL COMBUSTION ENGINE

[75] Inventor: Yoonsuk Kim, Kyungki, Rep. of Korea

[73] Assignee: Hyundai Motor Company, Rep. of Korea

[21] Appl. No.: 579,397

[22] Filed: Dec. 27, 1995

[30] Foreign Application Priority Data

Dec. 28, 1994 [KR] Rep. of Korea ............... 94-37994

[51] Int. Cl.$^6$ ............... F02B 31/00; F02D 9/08
[52] U.S. Cl. ............................................. 123/308
[58] Field of Search ............... 123/306, 308, 123/432, 442

[56] References Cited

U.S. PATENT DOCUMENTS

| 3,408,992 | 11/1968 | Von Seggern et al. | 123/306 X |
| 5,273,014 | 12/1993 | Mitobe et al. | 123/308 X |

FOREIGN PATENT DOCUMENTS

| 57-108409 | 7/1982 | Japan | 123/306 |

*Primary Examiner*—Tony M. Argenbright
*Attorney, Agent, or Firm*—Finnegan, Henderson, Farabow, Garrett & Dunner, L.L.P.

[57] ABSTRACT

Disclosed is a intake air control device for an internal combustion engine, which includes a swirl producing valve provided in the low speed intake tube for partly closing the intake port of the combustion chamber so as to impart swirling motion to the air flowing into the combustion chamber when operating the engine at a low speed including idling, an intake control valve provided in the high speed tube for completely closing the passage of the high speed tube when operating the engine at a low speed including idling. A valve control connects the accelerator pedal with the swirl producing valve and the intake control valve for simultaneously controlling the valves by moving the accelerator pedal so as to close the valves at a low speed including idling or to open the valves at a medium and a high speed, wherein the swirl producing valve is closed to make a narrow opening between its edge and the wall of the low speed intake tube for imparting the swirling motion to the intake air supplied from the surge tank to the combustion chamber.

6 Claims, 4 Drawing Sheets

INTAKE AIR CONTROL DEVICE FOR AN INTERNAL COMBUSTION ENGINE

BACKGROUND OF THE INVENTION

The present invention concerns an intake air control device for an internal combustion engine, which has a surge tank for temporarily storing the intake air taken in through the throttle valve linked in motion with the accelerator pedal, and a low speed and a high speed intake tube for supplying the intake air from the surge tank to the combustion chamber.

When operating the internal combustion engine at a low load before or after warming up including idling, poor combustion generally occurs due to the low flowing speed of the intake air compared to the engine operation at a high speed. In order to overcome this problem, there has been proposed a high performance engine in which each of the cylinders is provided with a long low speed intake passage for receiving the fresh air to improve the efficiency of filling the cylinder with the fresh air at a low speed and a short high speed intake passage for quickly receiving the fresh air to reduce the flowing resistance of the intake air at a high speed.

In such conventional intake control, the high speed intake passage is completely closed at a low speed, which results in an irregular engine operation due to the abrupt change of the amount of the intake air, and additionally makes it impossible to utilize the inertia of the intake thus reducing the filling efficiency of the intake air.

SUMMARY OF THE INVENTION

It is an object of the present invention to provide an intake air control device for an internal combustion engine, which obviates the irregular engine operation, and improves the combustibility, responsiveness and torque of the engine at a low speed including idling.

It is an object of the present invention to provide a means for increasing the filling efficiency of the intake air to secure the acceleration and to improve the combustibility and torque of the engine when speeding up.

According to the present invention, an intake air control device for an internal combustion engine comprises a swirl producing valve provided in the low speed intake tube for partially closing the intake port of the combustion chamber so as to impart swirling motion to the air flowing into the combustion chamber when operating the engine at a low speed including idling, an intake control valve provided in the high speed tube for completely closing the passage of the high speed tube when operating the engine at a low speed including idling, and a valve control means connecting the accelerator pedal with the swirl producing valve and the intake control valve for simultaneously controlling the valves by moving the accelerator pedal so as to close the valves at a low speed including idling or to open the valves at a medium and a high speed, wherein when the swirl producing valve is closed it makes a narrow opening between its edge and the wall of the low speed intake tube for imparting the swirling motion to the intake air supplied from the surge tank to the combustion chamber.

Preferably, the valve control means comprises a first group of gears fixedly mounted on a drive shaft, a second group of gears engaged with the first group of gears, a pulley fixedly mounted on the drive shaft, a cord for connecting the pulley with the accelerator pedal to transmit the motion of the acceleration pedal to the drive shaft, a return spring fixedly mounted between the pulley and the high speed tube for resiliently returning the shaft to the original closed position. The intake control valve is fixedly mounted on the drive shaft, and the swirl producing valve to the second group of gears, so that the motion of the accelerator pedal moves the valves to the open position or the close position.

Thus, the intake air flowing through the swirl producing valve rapidly swirls into the combustion chamber at a low speed, so that the irregular engine operation is prevented and the combustibility and torque of the engine are improved. Moreover, since the swirl producing valve and the intake control valve are simultaneously opened at a medium or high speed operation, the efficiency of filling the combustion chamber with the fresh air is increased to improve the torque of the engine, thereby improving the acceleration.

The present invention will now be described more specifically with reference to the drawings attached only by way of example.

DETAILED DESCRIPTION OF PREFERRED EMBODIMENTS

Figure 1:
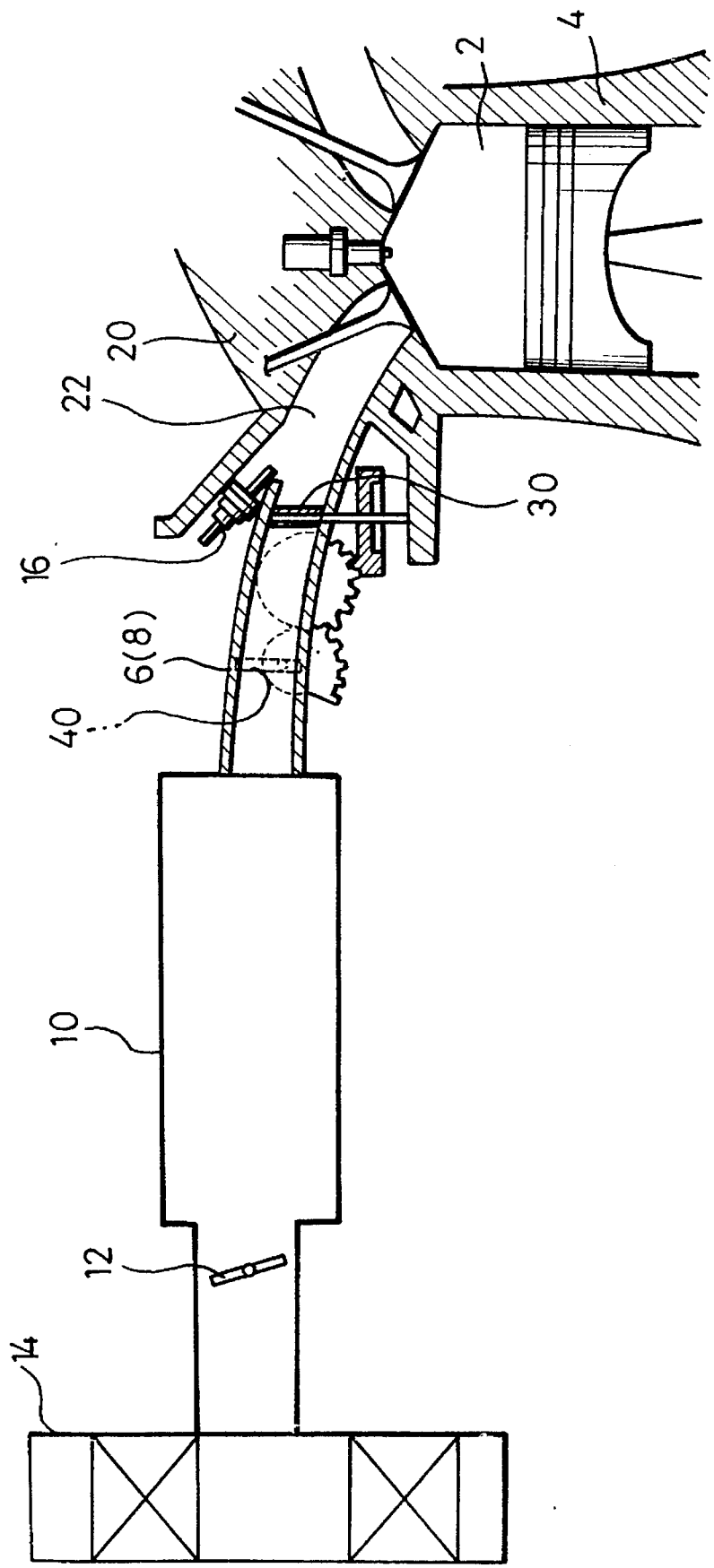
FIG. 1 is a longitudinal cross sectional view of the inventive intake air control device mounted in the intake tubes of an internal combustion engine.

Referring to FIG. 1, there is shown a surge tank 10 for temporarily storing the air supplied through an air cleaner 14 by the opening and closing of a throttle valve 12 operatively connected with an accelerator pedal. The surge tank 10 communicates with a combustion chamber 2 by means of a low speed and a high speed intake tube 6 and 8, which are connected with an intake port 22 of a cylinder head 20 forming the combustion chamber 2 with the cylinder block 4. In addition, the intake port 22 adjacent to the low speed intake tube 6 is provided with an injector 16.

The intake air control device includes a swirl producing valve 30 provided in the low speed intake tube 6 for partly closing the intake port 22 of the combustion chamber 2 so as to impart swirling motion to the air flowing into the combustion chamber when operating said engine at a low speed including idling, and an intake control valve 40 provided in the high speed intake tube 8 for completely closing the passage of the high speed tube when operating the engine at a low speed including idling. The swirl producing valve 30 and the intake control valve 40 are completely opened to increase the efficiency of filling the combustion chamber with fresh air when operating the engine at a medium or high speed.

The swirl producing valve 30 may be pivotally mounted on the inside of the low speed intake tube 6, but preferably mounted in the intake port 22 to enhance the swirling effect of the intake air flowing into the combustion chamber 2, as shown in FIG. 1. The injector 16 is provided behind the swirl producing valve 30 to inject fuel into the combustion chamber.

Figure 2:
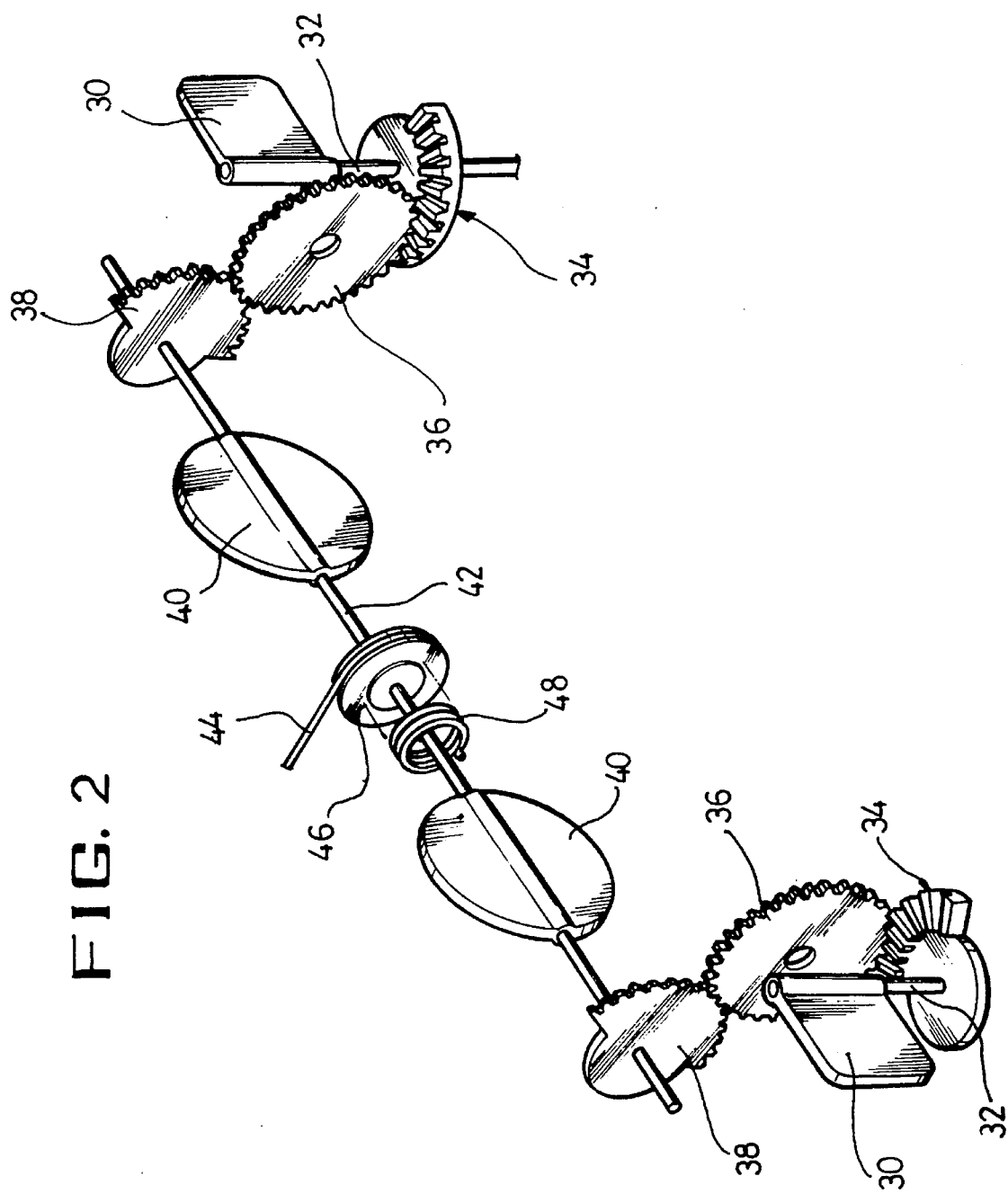
FIG. 2 is a schematic perspective view for illustrating the inventive intake air control device.

A valve control mechanism, which is provided to connect the accelerator pedal with the swirl producing valve 30 and the intake control valve 40 as shown in FIG. 2, simultaneously controls the valves 30, 40 by moving the accelerator pedal so as to close the valves 30, 40 at a low speed including idling or to open the valves 30, 40 at a medium and a high speed. The valve control mechanism includes a first group of gears 38 fixedly mounted on a drive shaft 42, and a second group of gears 36, 34 engaged with the first group of gears 38. A pulley 46 is fixedly mounted on the drive shaft 42. Also provided is a cord 44 for connecting the pulley with the accelerator pedal to transmit the motion of the accelerator pedal to the drive shaft 42. A return spring 48 is fixedly mounted between the pulley 46 and the high speed tube 8 to resiliently return the drive shaft 42 to the original closed position when releasing the accelerator pedal. The intake control valve 40 is fixedly mounted on the drive shaft 42, and the swirl producing valve 30 to the second group of gears 36, 34. Thus, the motion of the accelerator pedal moves the valves 30, 40 to the open position or the closed position.

The first group of gears consists of a pair of first gears 38 respectively mounted on both ends of the drive shaft 42. The second group of gears consists of a pair of second gears 36 respectively engaged with the pair of first gears 38, and a pair of third gears 34 respectively engaged with the pair of second gears 36. Each of the third gears 34 has a plurality of teeth formed along the edge of one side of a circular plate adjacent to the perimeter, so that the second gears 36 are perpendicularly arranged with respect to the third gears 34. The swirl producing valve 30 is fixedly mounted to the third gears 34 by means of a pivot shaft 32 pivotally mounted on the cylinder head 20.

Figure 3:
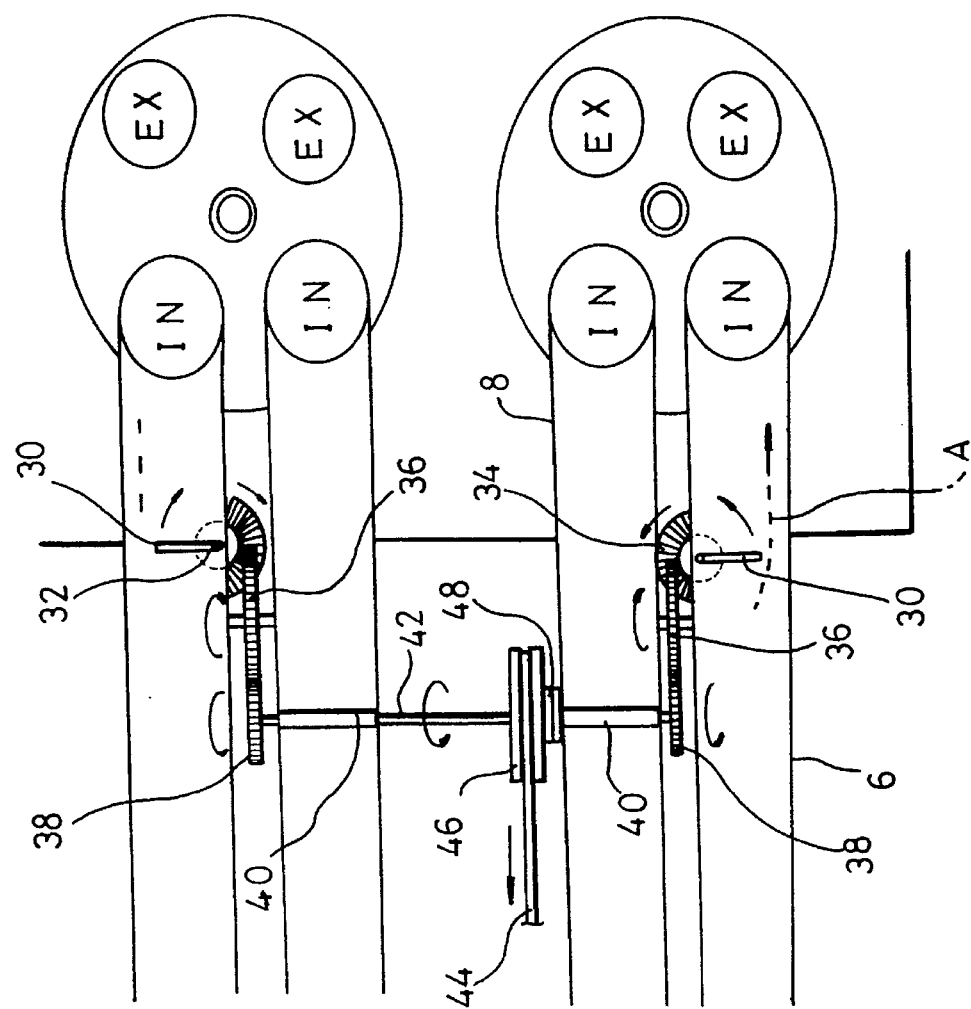
FIG. 3 is a plan view for schematically illustrating the inventive intake air control device closing the valves in the intake tubes.
Figure 4:
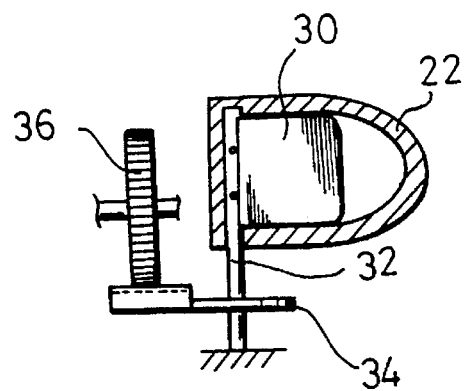
FIG. 4 schematically illustrates the structure of the swirl valve of the inventive intake air control device.

Referring to FIG. 3, when the accelerator pedal is released, the swirl producing valve 30 is closed to make a narrow opening between its edge and the wall of the low speed intake tube 6, which narrow opening causes the intake air supplied from the surge tank to the combustion chamber 2 to swirl as indicated by dotted line "A". Namely, when the swirl producing valve 30 is moved to the closed position, a narrow opening forms between the edge of the swirl producing valve 30 and the wall of the intake port 22, which increases the flow speed of the intake air to impart a swirling motion to the air. In this case, the intake control valve 40 completely blocks the high speed intake tube 8 cutting off the air flow. Thus, at a low speed including idling, the low speed intake tube 6 only serves as the supply tube for passing the fresh air "A" through the swirl producing valve 30 to the combustion chamber 2, so that the strong swirling motion enhances the combustibility and torque of the engine, and prevents the irregularity of the engine operation.

When the accelerator pedal is pressed, the cord 44 is pulled rotate the pulley 46 and thus the drive shaft 42, so that the intake control valve 40 opens to cause the fresh air to flow through the high speed intake tube 8 into the combustion chamber 2. Meanwhile, the swirl producing valve 30 is also opened by the cooperation of the first, second and third gears 38, 36 and 34, thereby lessening the intensity of the swirling motion of the fresh air supplied through the intake port 22 to the combustion chamber 2. Since a strong swirling motion of the intake air reduces the fuel combustibility at a medium or high speed, it is preferable to lessen the intensity of the swirling motion.

Figure 5:
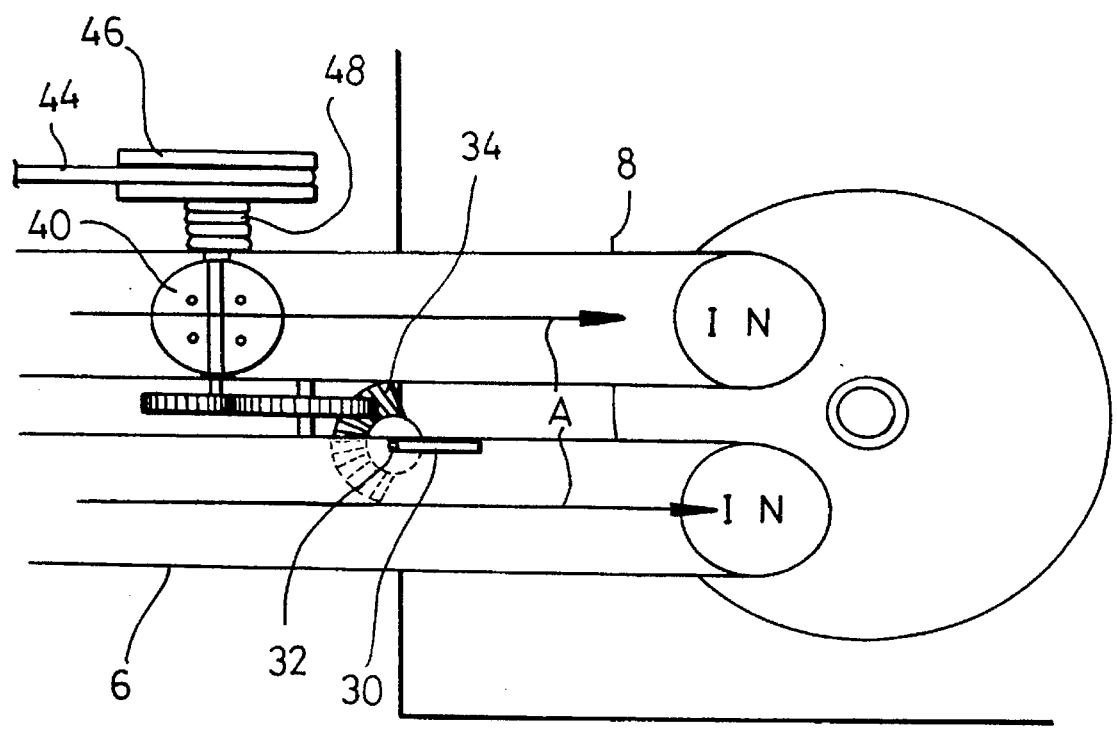
FIG. 5 is a plan view for schematically illustrating the inventive intake air control device opening the valves in the intake tubes.

When the accelerator pedal is pressed further, the intake control valve 40 and the swirl producing valve 30 are completely opened, as shown in FIG. 5, so as to cause the fresh air "A" to freely flow through the low speed and high speed intake tubes 6 and 8 into the combustion chamber 2. Hence, the efficiency of filling the combustion chamber 2 with the fresh air is enhanced to maximize the output torque of the engine, improving acceleration to a higher speed.

When the accelerator pedal is released, the intake control valve 40 and the swirl producing valve 30 are closed as shown in FIG. 3, so that the low speed intake tube 6 only serves as the supply tube, thereby imparting the swirling motion to the intake air supplied to the combustion chamber 2.

What is claimed is:

1. In an internal combustion engine having a surge tank for temporarily storing intake air taken in through a throttle valve coupled to an accelerator pedal, and low speed and high speed intake tubes for supplying the intake air from the surge tank to a combustion chamber, an intake air control device comprising:

a swirl producing valve provided in the low speed intake tube for partially closing an intake port of the combustion chamber so as to impart swirling motion to air flowing into the combustion chamber when operating the engine at a low speed including idling;

an intake control valve provided in the high speed intake tube for completely blocking passage of air through the high speed intake tube when operating the engine at said low speed; and valve control means for simultaneously controlling the swirl producing valve and the intake control valve by moving the accelerator pedal so as to close the swirl producing valve and the intake control value at said low speed or to open the swirl producing valve and the intake control valve at medium and high speeds of the engine, wherein when the swirl producing valve partially closes the intake port, a narrow opening forms between an edge of the swirl producing valve and a wall of the low speed intake tube for imparting the swirling motion to the intake air supplied from the surge tank to the combustion chamber.

2. The intake air control device recited in claim 1, wherein the valve control means comprises a first driving gear fixedly mounted on a drive shaft, a group of driven gears engaged with the first driving gear, a pulley fixedly mounted on the drive shaft, a cord for connecting the pulley with the accelerator pedal to transmit movement of the accelerator pedal to the drive shaft, and a return spring fixedly mounted between the pulley and the high speed intake tube for resiliently returning the drive shaft to a predetermined position, the intake control valve being fixedly mounted on the drive shaft, and the swirl producing valve being fixedly mounted to the group of driven gears, so that movement of the accelerator pedal opens or closes the swirl producing valve and the intake control valve.

3. The intake air control device recited in claim 2, further comprising a second driving gear mounted adjacent to one end of the drive shaft, wherein the first driving gear is mounted adjacent to another end of the drive shaft.

4. The intake air control device recited in claim 3, wherein the group of driven gears comprises a pair of first driven gears respectively engaged with the first and second driving gears, and a pair of second driven gears engaged with the pair of first driven gears.

5. The intake air control device recited in claim 4, wherein each of the second driven gears is a plate having a plurality of teeth formed on one side of the plate adjacent a perimeter of the plate, so that axes of rotation of the pair of first driven gears are perpendicular to axes of rotation of the second driven gears.

6. The intake air control device recited in claims 4 or 5, wherein the swirl producing valve is fixedly mounted to the pair of second driven gears.

* * * * *

UNITED STATES PATENT AND TRADEMARK OFFICE
CERTIFICATE OF CORRECTION

PATENT NO. : 5,592,917
DATED : January 14, 1997
INVENTOR(S) : Yoonsuk KIM

It is certified that error appears in the above-indentified patent and that said Letters Patent is hereby corrected as shown below:

Column 4, line 26, claim 1, change "value" to --valve--.

Signed and Sealed this

Fourth Day of March, 1997

Attest:

BRUCE LEHMAN

*Attesting Officer*      *Commissioner of Patents and Trademarks*